United States Patent [19]

Lande et al.

[11] 4,279,529

[45] Jul. 21, 1981

[54] PROFILE SYSTEM

[75] Inventors: Harald Lande, Avaldsnes; Leif Johannessen, Konsmo, both of Norway

[73] Assignee: Norsk Hydro a.s., Oslo, Norway

[21] Appl. No.: 96,558

[22] Filed: Nov. 21, 1979

[30] Foreign Application Priority Data

Nov. 29, 1978 [NO] Norway ................................. 784009

[51] Int. Cl.³ .............................................. F16B 9/00
[52] U.S. Cl. ....................................... 403/246; 256/65
[58] Field of Search ............... 403/245, 246, 295, 255, 403/254, 230; 256/68, 65, 70

[56] References Cited

U.S. PATENT DOCUMENTS

| 3,294,429 | 12/1966 | Halip | 403/295 |
| 3,498,589 | 3/1970 | Murdock | 256/70 |
| 4,050,828 | 9/1977 | Noro | 256/65 X |

FOREIGN PATENT DOCUMENTS

| 932876 | 9/1955 | Fed. Rep. of Germany . | |
| 480589 | 12/1969 | Switzerland | 403/402 |

Primary Examiner—Andrew V. Kundrat
Attorney, Agent, or Firm—Wenderoth, Lind & Ponack

[57] ABSTRACT

A structural assembly includes an elongated support member having an end and a wall extending from the end. The wall has therein, at a location spaced from the end, a transverse opening. An elongated beam is positioned to be connected to the support member at the end thereof, the beam having first and second surface portions. An angle-shaped joining member has first and second outwardly extending wings. The first wing has at least one transverse projection, which extends through the transverse opening in the wall of the support member. The second wing has first and second surfaces. The second wing extends along the beam with the first surface of the second wing confronting the first surface portion of the beam. A wedge is wedged between the second surface of the second wing and the second surface portion of the beam to urge the joining member such that the first surface of the second wing is urged toward the first surface portion of the beam and such that the transverse projection of the first wing is urged into the transverse opening in the wall of the support member.

12 Claims, 2 Drawing Figures

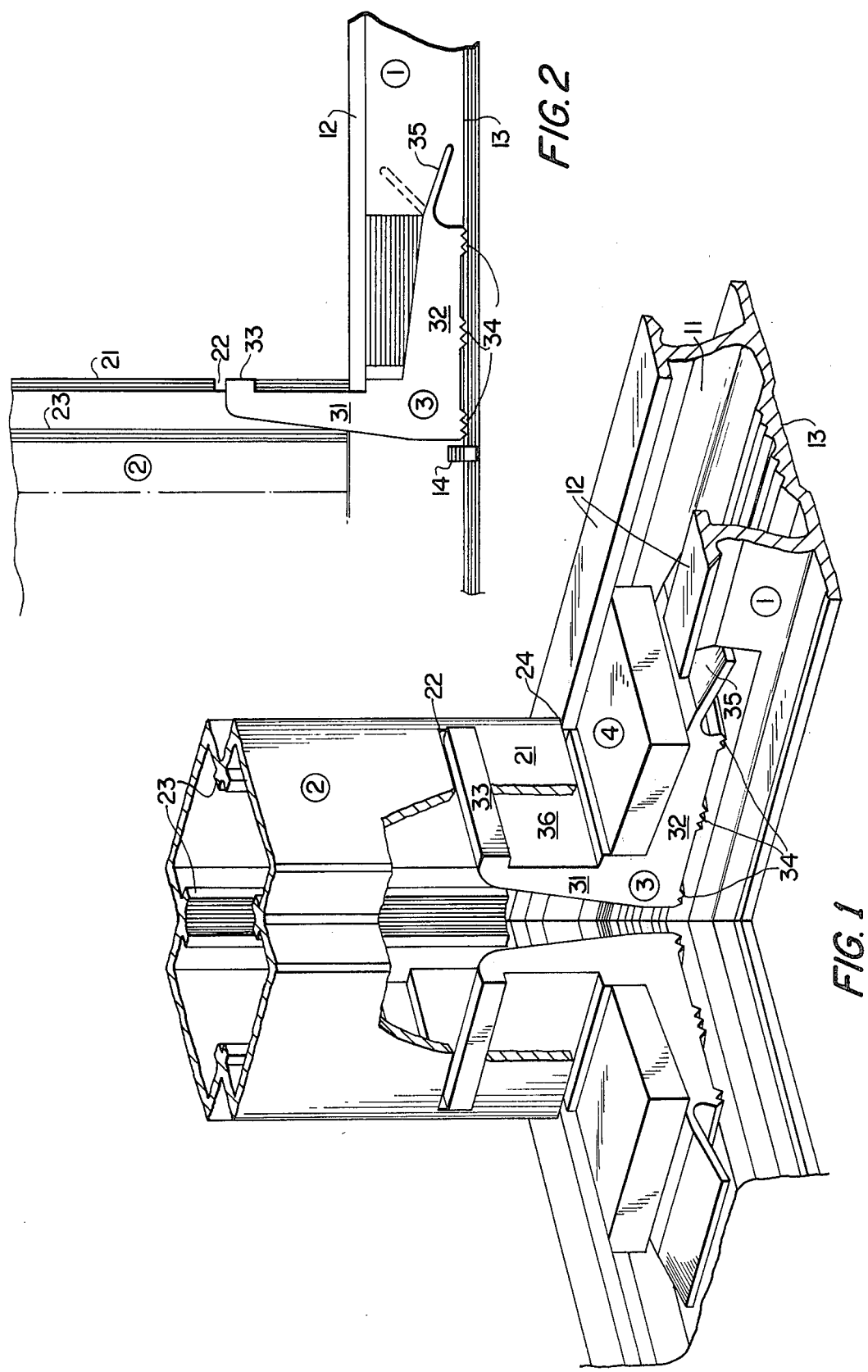

PROFILE SYSTEM

BACKGROUND OF THE INVENTION

This invention relates to a structural assembly or profile system comprising support members and beams, which are joined together at right angles, and a specially shaped joining element with a co-operating wedge which joins the support members and beams together. The profile system is especially applicable in frame works, further on in other joinings of the frame work type, scaffolds and other constructions where one of the profiles is supported by its front part alongside the other profile.

Previous known constructions of this type often use joining elements which fill up the cavity in one or both of the profiles, and these joining elements are fastened by means of bolts or screws to the profiles. Further there is a known joining principle based upon expansion of the joining element, e.g. by means of a screw which presses apart splitted parts of the joining element.

A common drawback for all known joining systems is a complicated and laborious manufacture and assembly of such joining elements requiring strict limits regarding tolerances and working. Further, it is necessary to provide openings in the outer walls of the profiles for fastening of screws, bolts, etc., which openings are left open in such way that dirt and humidity can penetrate the profiles and cause corrosion damage. In some cases such holes will disfigure the appearance of the construction.

Previous attempts to use joining elements with a wedge effect based only upon the friction resistance did not result in a sufficiently safe connection. Therefore, in addition to wedges, glue was used in order to make the profile walls and joining element surfaces stick together, or eventually some other additional fasten device was used.

SUMMARY OF THE INVENTION

The present invention provides a joining system employing the wedge principle, which system without having the above mentioned drawbacks and weak points gives simple, versatile and safe connection between two profiles.

The advantage of this system according to the invention is its simple form and application which provides a suprisingly good mechanical strength. Further, the system is characterized by its versatility which allows joining any place along the beam independent of pre-perforated openings. The main components of the system are manufactured as extruded profiles, preferentially of aluminum. The word aluminum including all the actual Al-alloys which are used in this technology.

The characterristic features of the system are pointed out in the following description and subsequent claims.

BRIEF DESCRIPTION OF THE DRAWINGS

Below is a complete detailed description of an embodiment of the profile system of the invention with reference to the accompanying drawings, where:

FIG. 1 is a perspective view, with portions in section, illustrating the joining of two beams and one support member where the system comprises two joining elements.

FIG. 2 is an elevation view, with portions broken away.

DETAILED DESCRIPTION OF THE INVENTION

The joining element in FIG. 1 is shaped as an angular fastening bracket (3) with two wings (31, 32). One of the wings (31) is provided with a projection (33) which cooperates with a groove or opening (22) in profile wall (21) of a support member (2). The other wing (32) has its outer surface, which faces toward a U-shaped channel (11) in a beam (1), provided with lateral projections (34). The projections for serrated surfaces which extend perpendicular to the corresponding projections formed on arched bottom (13) of the channel (11). The wing is terminated by a bendable flap (35) which forms an integral part of the bracket (3).

The support member (2) is a hollow profile having a substantially square cross-section and its front part (24) being located alongside the beam (1) in such way that the support member stops at a right angle and abuts against two laterally outwardly extending flanges (12) on the beam. The flanges form a combined support area for the support member and a locking plane or surface against which a wedge (4) is used for wedging and fastening the bracket (3) to the beam.

Wings 31, 32 of the bracket are inserted in the support member and beam, respectively. A suitable shape of the wing (31) with a downwardly increasing cross-section ensures locking of the bracket in the support member when the projection (33) is placed in the groove (22).

Two guiding flanges (23) inside the walls 21 of the support member, which flanges run parallel to its longitudinal axis, facilitate insertion of the bracket into the support member and at the same time prevent the bracket from being pressed out of position during insertion of the wedge (4). The wedge locks the wing (32) in the U-shaped channel (11), and the wedge itself is secured against sliding by the end flap (35) which is bent upwardly as indicated in FIG. 2.

FIG. 2 shows in principle the profile system with an alternative form of the bottom part (13) of the beam which is provided with a retaining projection (14). The retaining projection will further facilitate assembly in the case where the joining points have been determined in advance and further allows application of support members of simplified forms.

The invention is not limited to the above described embodiments. The support member which is shown in FIG. 1 as a hollow profile can be replaced by other appropriately formed profiles, e.g. a U-shaped profile.

We claim:

1. A structural assembly comprising:
    an elongated support member having an end and a wall extending from said end, said wall having therein, and a location spaced from said end, a transverse opening;
    an elongated beam to be connected to said support member at said end thereof, said beam having first and second surface portions;
    joining means for connecting said beam to said end of said support member such that said beam extends outwardly at an angle with respect to said wall of said support member;
    said joining means comprising an angle-shaped member having first and second outwardly extending wings, said first wing having at least one transverse projection extending through said transverse opening in said wall of said support member, said second wing having first and second surfaces, said second wing extending along said beam with said first surface of said second wing confronting said first surface portion of said beam; and wedge means, wedged in a location between said second surface of said second wing and said second surface portion of said beam, for urging said angle-shaped member such that said first surface of said second wing is urged toward said first surface portion of said beam and such that said transverse projection of said first wing is urged into said transverse opening in said wall of said support member.

2. A structural assembly as claimed in claim 1, wherein said second wing includes integral bendable flap means for, upon said wedge means being in said location thereof, being bent towards said wedge means, and for thereby preventing sliding of said wedge means from said location thereof.

3. A structural assembly as claimed in claim 1, wherein said support member includes a portion having a U-shaped transverse cross-sectional configuration.

4. A structural assembly as claimed in claim 1, wherein said first wing has a cross-sectional thickness which increases from said projection to said second wing.

5. A structural assembly as claimed in claim 1, wherein said beam has a U-shaped cross-sectional configuration including a pair of legs joined at first ends thereof by a web, and a pair of flanges extending inwardly from second ends of said legs.

6. A structural assembly as claimed in claim 5, wherein said first surface portion of said beam comprises an inner surface of said web, and said second surface portion of said beam comprises inner surfaces of said pair of flanges.

7. A structural assembly as claimed in claim 5, wherein said pair of flanges are spaced by a distance sufficient to allow the insertion therebetween of said second wing of said angle-shaped member.

8. A structural assembly as claimed in claim 5, wherein said end of said support member abuts outer surfaces of said pair of flanges.

9. A structural assembly as claimed in claim 5, wherein an inner surface of said web has extending therefrom longitudinal projections forming longitudinal serrations, said first surface of said second wing has extending therefrom transverse projections forming transverse serrations, and said wedge means urges said transverse serrations against said longitudinal serrations.

10. A structural assembly as claimed in claim 1, wherein said support member is hollow and further includes a pair of inwardly extending flanges spaced from said wall and defining therebetween a space sufficient for the insertion, longitudinally of said support member, of said first wing.

11. A structural assembly as claimed in claim 10, wherein said pair of flanges of said support member are dimensioned to prevent movement of said angle-shaped member in a direction away from said wall upon the positioning of said wedge means in said location thereof.

12. A structural assembly as claimed in claim 10, wherein said hollow support member is generally square in cross-section and is formed by four said walls, plural of said walls having therein a respective said transverse opening.

* * * * *